United States Patent
Carlsson et al.

(10) Patent No.: US 7,033,411 B2
(45) Date of Patent: Apr. 25, 2006

(54) CENTRIFUGAL SEPARATOR FOR CLEANING OF A GASEOUS FLUID

(75) Inventors: Claes-Göran Carlsson, Tullinge (SE); Thomas Eliasson, Älvsjö (SE); Peter Franzén, Tullinge (SE); Ingvar Hällgren, Tumba (SE); Torgny Lagerstedt, Stockholm (SE)

(73) Assignee: Alfa Laval Corporate AB, Lund (SE)

( * ) Notice: Subject to any disclaimer, the term of this patent is extended or adjusted under 35 U.S.C. 154(b) by 53 days.

(21) Appl. No.: 10/415,173

(22) PCT Filed: Oct. 18, 2001

(86) PCT No.: PCT/SE01/02276

§ 371 (c)(1),
(2), (4) Date: Feb. 9, 2004

(87) PCT Pub. No.: WO02/34407

PCT Pub. Date: May 2, 2002

(65) Prior Publication Data

US 2004/0107681 A1  Jun. 10, 2004

(30) Foreign Application Priority Data

Oct. 27, 2000  (SE)  .................................... 0003914

(51) Int. Cl.
  B01D 45/14  (2006.01)
(52) U.S. Cl. ...................................................... 55/406
(58) Field of Classification Search .................. 55/406, 55/400, 401, 437, 438; 494/56, 70
See application file for complete search history.

(56) References Cited

U.S. PATENT DOCUMENTS 3,234,716 A * 2/1966 Sevin et al. ............. 210/360.1
3,997,104 A * 12/1976 Hein .......................... 494/16

FOREIGN PATENT DOCUMENTS

| EP | 0 011 270 A1 | 5/1980 |
| FR | 664254 | 8/1929 |
| GB | 1 465 820 | 3/1977 |
| WO | WO 99/56883 | 11/1999 |

* cited by examiner

Primary Examiner—Robert A. Hopkins
(74) Attorney, Agent, or Firm—Michaud-Duffy Group LLP

(57) ABSTRACT

A centrifugal separator for cleaning of a gas from solid and/or liquid particles suspended therein, includes a stationary housing and a rotor arranged therein. The rotor at its one axial end has a central inlet for gas to be cleaned and delimits a central space communicating with the inlet. Around the central space a stack of conical separation discs is arranged in the rotor. These discs form between themselves several through flow passages which at their one ends communicate with the central space in the rotor and at their other ends communicate directly with a receiving chamber surrounding the rotor in the stationary housing. The rotor supports several turbine blades, which are arranged in a ring around the central inlet of the rotor, and at least one nozzle is adapted to direct a gaseous driving fluid towards the turbine blades for the rotor rotation.

16 Claims, 2 Drawing Sheets

CENTRIFUGAL SEPARATOR FOR CLEANING OF A GASEOUS FLUID

FIELD OF THE INVENTION

The present invention relates to a centrifugal separator for freeing a gaseous fluid from particles suspended therein, solid and/or liquid, having a density larger than that of the gaseous fluid. Particularly, the invention concerns a centrifugal separator for this purpose, including a rotor, that is rotatable about a rotational axis and has at one axial end a central inlet for said gaseous fluid, the rotor further delimiting a central space communicating with said central inlet, a driving means for rotation of the rotor about said rotational axis, a stationary housing which with a surrounding wall surrounds the rotor and said rotational axis and which between the rotor and the surrounding wall delimits a receiving chamber (44) for cleaned gaseous fluid as well as separated particles, stationary inlet means situated at said axial end of the rotor and forming a gas inlet for the gaseous fluid, which communicates with the central inlet of the rotor, and separation members supported by the rotor around said central space and forming several separation passages which have inlet ends communicating with the central space in the rotor and outlet ends opening directly into one part of said receiving chamber.

BACKGROUND OF THE INVENTION

A centrifugal separator of this kind is known by EP 0 011 270 A.

One object of the invention is to provide a centrifugal separator of the defined kind, having a driving means that makes possible both a compact construction of the whole centrifugal separator and an efficient operation thereof.

Another object is to provided a centrifugal separator of the defined kind, in which the flow paths for uncleaned and cleaned gaseous fluid and for separated particles extend in a way such that no conflict arises between the requirement of a compact construction and the requirement of an efficient driving of the centrifugal separator.

SUMMARY OF THE INVENTION

These objects may be obtained in a centrifugal separator of the kind initially defined, that is characterized in that said driving means includes several turbine members, which are supported by the rotor and arranged in a ring around the central inlet of the rotor, and at least one supply member, e.g. a stationary nozzle, that is adapted to receive a gaseous driving fluid and direct this towards the turbine members for rotation of the rotor about said rotational axis.

By means of a driving means of this kind the centrifugal separator may be made very compact, whereby the centrifugal separator can relatively easily be used even where very little space is available, such as for instance in engine compartments of vehicles. The centrifugal separator is well suited among other things for cleaning of crankcase gases coming from internal combustion engines. The gaseous driving fluid required for the operation of the centrifugal separator may be conducted for instance through a hose to the centrifugal separator, which means that the centrifugal separator does not have to be placed immediately close to the drive source itself, e.g. a compressor or a pressure vessel for compressed air.

Preferably, a centrifugal separator according to the invention also includes stationary first outlet members forming a gas outlet from the receiving chamber for gaseous fluid having been freed from particles, and stationary second outlet members forming a particle outlet from the receiving chamber, separate from the gas outlet, for particles having been separated from the gaseous fluid.

A centrifugal separator according to the invention can be oriented in an suitable way. However, particularly good conditions are created for taking care of cleaned fluid and separated particles if the centrifugal separator is oriented with said rotational axis extending substantially vertically and with the inlet for uncleaned gaseous fluid situated at the upper end of the rotor.

Preferably, said particle outlet is situated centrally below the rotor, substantially aligned with said rotational axis, said gas outlet being situated between the particle outlet and said part of the receiving chamber, in which the separation passages of the rotor are opening.

Advantageously, the stationary housing surrounding the rotor is formed in a way such that driving fluid, having been used for driving of the rotor and thus leaving the ring of turbine members, is introduced into said receiving chamber and then leaves the centrifugal separator together with the cleaned gaseous fluid. If the centrifugal separator is used for cleaning of crankcase gases coming from a combustion engine and the centrifugal rotor is driven by means of compressed air coming from a turbo compressor belonging to the engine, said gas outlet may be connected to an air intake of the motor combustion room.

The aforementioned at least one supply member, which shall direct the gaseous driving fluid towards the turbine members on the rotor, may be arranged in different ways. It is possible to arrange the supply member in a way such that it directs the driving fluid axially towards the turbine members. However, it would be most advantageous to arrange the supply member or the supply members radially inside or outside the ring of rotor turbine members. If two or more supply members are used, they are suitably distributed evenly around the ring of turbine members, so that a balanced load is obtained on the rotor from the forces to which it is subjected by the driving fluid. If only two supply members are used, they are therefore arranged at diametrically opposite sides of the ring of the turbine members. This is advantageous for the life of the bearings, by which the rotor is suspended in a stationary supporting device, e.g. the aforementioned stationary housing.

In a preferred embodiment of the centrifugal separator according to the invention the rotor is connected with a central supporting shaft which through a bearing device is suspended in a stationary supporting member, the ring of turbine members on the rotor being arranged substantially in the same axial plane as said bearing device. If the bearing device, in practice, is constituted by two somewhat axially spaced bearings, the ring of turbine members is preferably situated in a plane axially in the middle between these two bearings.

BRIEF DESCRIPTION OF THE DRAWINGS

The invention is further described in the following with reference to the accompanying drawings, in which FIG. I shows an axial section through a centrifugal separator according to a preferred embodiment of the invention

DETAILED DESCRIPTION OF THE PREFERRED EMBODIMENTS

Figure 1:
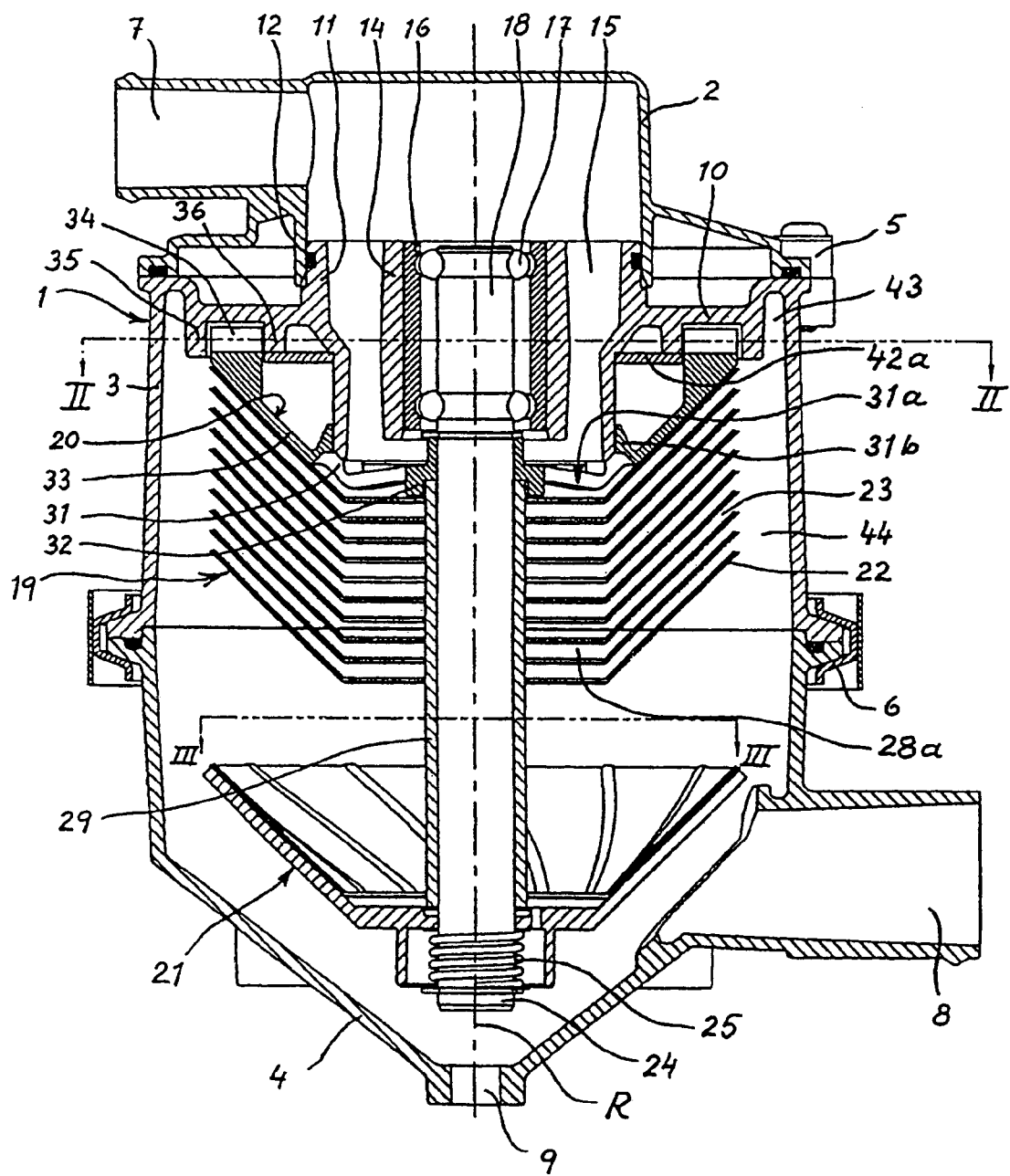

The centrifugal separator shown in the drawings comprises a stationary housing 1 consisting of an upper part 2, an intermediate part 3 and a lower part 4. The parts are kept together by means of clamping members 5 and 6. The upper housing part 2 forms an inlet 7 for a gas or gas mixture to be cleaned by means of the centrifugal separator. The lower housing part 4 forms both an outlet 8 for gas having been cleaned and an outlet 9 for material having been separated from the gas.

The intermediate part 3 of the stationary housing forms a surrounding wall surrounding a space within the housing and has, at its upper end, an annular end wall 10 extending a distance inwardly from the surrounding wall. Within the housing the annular end wall 10 supports a central sleeve 11, the interior of which communicates with the above mentioned gas inlet 7 formed by the upper housing part 2. A gasket 12 is adapted to seal between the upper housing part 2 and the sleeve 11.

The sleeve 11 supports in its said interior, by means of several supporting members 13 (see FIG. 2), a central hub 14. The supporting members 13 are distributed around the periphery of the sleeve and leaves between themselves several passages 15 which at their upper ends communicate with the aforementioned gas inlet 7.

On its inside the hub 14 supports a bearing sleeve 16 which, in turn, supports through bearing balls 17 a vertically extending shaft 18. The shaft 18 extends downwardly within the housing 1 and supports therein a rotor 19. The rotor is rotatable in the housing 1 about a vertical rotational axis R.

The rotor 19 comprises a substantially conical or bowl-formed upper end wall 20 and a lower end wall 21 formed in the same way. Both end walls 20 and 21 are facing with their concave sides upwardly towards the gas inlet 7 of the stationary housing. Between the end walls there is arranged a stack of conical separation discs 22 (only part of the stack is shown in FIG. 1), which between themselves delimit thin interspaces forming through flow passages 23 for gas to be cleaned in the centrifugal separator. The end walls 20 and 21 and the separation discs 22 are kept axially compressed on the shaft 18 by means of a screw 24 and a spring 25.

Figure 3:
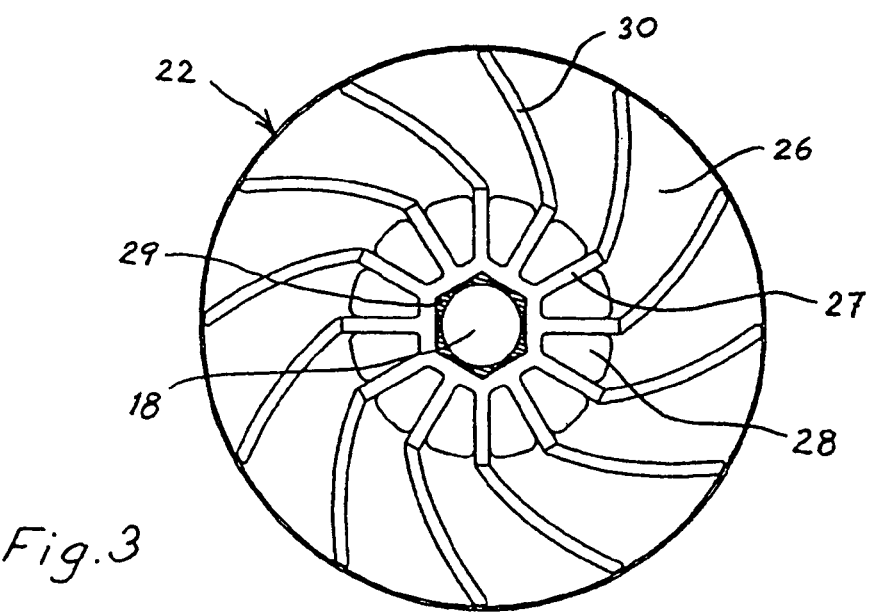

FIG. 3 shows a separation disc 22 seen from above with respect to FIG. 1. The disc has a conical outer portion 26 and a central portion 27 connected therewith. The central portion has a large number of through holes 28 situated at some distance from the center of the disc and distributed therearound. In the assembled rotor 19 (see FIG. 1) these holes 28 form together with the interspaces between the central portions 27 of the discs a central space 28a, which communicates with the aforementioned through passages 23 between the discs 22. Furthermore, the central portion 27 has a central non-round, in this case hexagonal, opening through which the aforementioned shaft 18 is intended to extend. As can be seen from both FIG. 1 and FIG. 3, the shaft 18 is surrounded by a sleeve 29 extending axially between the rotor end walls 20 and 21. The sleeve 29 has a circular inner cross section but a hexagonal outer cross section, so that the outside of the sleeve may be in rotational engagement with both the separation discs 22 and the end walls 20 and 21.

On the upper side of each disc 22 there are several rib-like protuberances 30, which are evenly distributed around the disc center and which extend across the conical portion 26 of the disc from the central portion 27 to the surrounding edge of the disc. The protuberances 30 serve both as spacing members between adjacent separation discs 22 in the rotor and as flow guiding members during the operation of the centrifugal separator, as will be explained later. The rib-like protuberances extend in a way such on each separation disc that they form an angle with the generatrices of the conical portion 26 of the separation disc.

The upper end wall 20 of the rotor has a radially inner portion 31, that is formed in one piece with a central sleeve 32 surrounding the shaft 18, and a radially outer portion 33. The radially inner portion 31 of the end wall 20 has several through holes 31a distributed around the central sleeve 32 and forming a central inlet of the rotor 19 for gas to be cleaned. The holes or inlet 31a communicate with the gas inlet 7 in the stationary housing part 2 through the interior of the stationary sleeve 11. The radially inner portion 31 of the end wall 20 further has an annular axial flange 31b, which surrounds an end portion of the stationary sleeve 11 in a way such that a smallest possible interspace is present between the flange 31b and the sleeve 11. If desired, a gasket may be arranged in this interspace.

Figure 2:
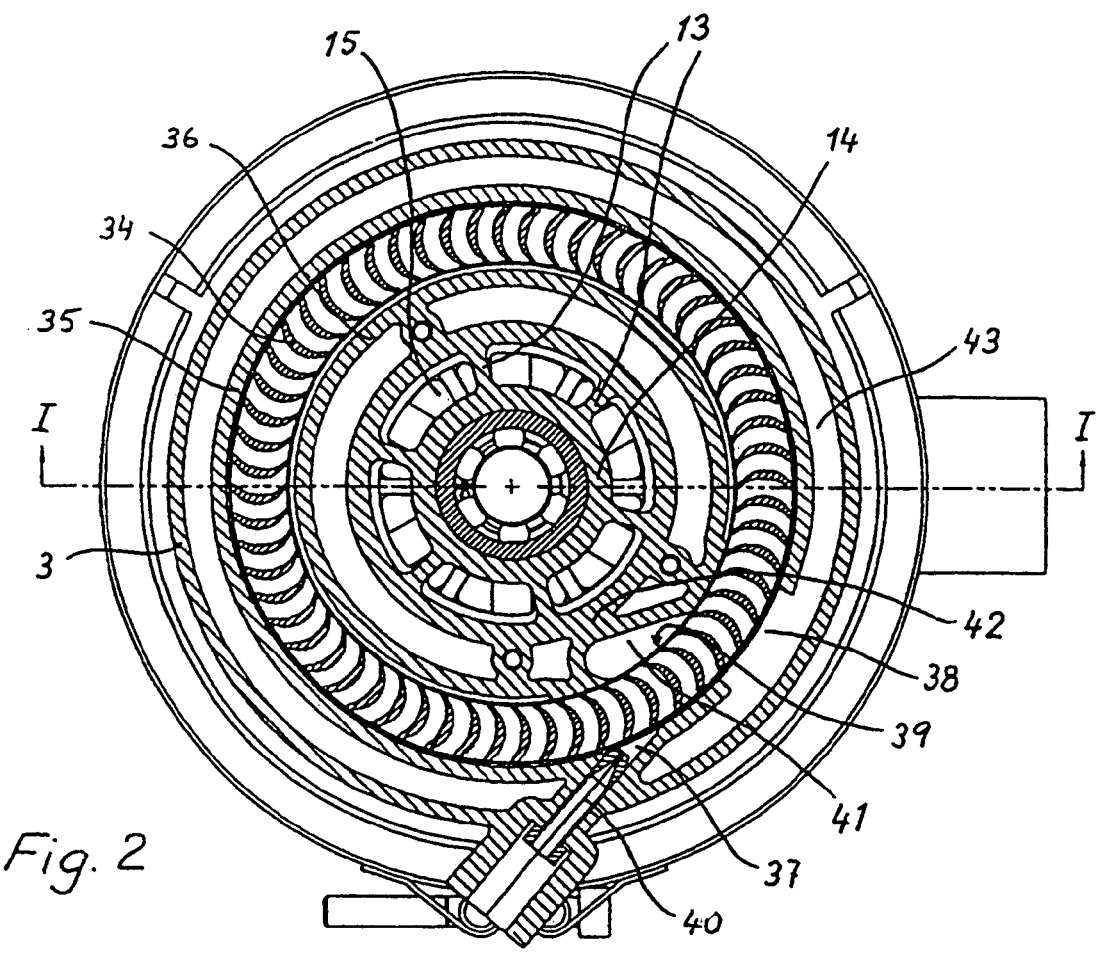
FIGS. 2 and 3 show cross sections along the lines II—II and III—III, respectively, in FIG. 1. The axial section in FIG. 1 is taken along the line I—I in FIG. 2.

The radially outer portion 33 of the end wall 20 supports on its upper side a ring of turbine blades 34, extending concentrically with the rotational axis R of the rotor (see FIG. 2). The blades 34 are arranged in a downwardly facing annular groove on the underside of the end wall 10, formed between two downwardly directed annular, concentrical flanges 35 and 36. The ring of turbine blades, thus, are supported on the radially largest portion of the rotor.

As can be seen from FIG. 2, the two flanges 35 and 36 do not extend circularly all the way around the rotational axis R of the rotor. Thus, the outer flange 35 has two interruptions or gaps 37 and 38, whereas the inner flange 36 has one interruption or gap 39. Supported by the intermediate part 3 of the stationary housing a nozzle 40 extends into the first said interruption or gap 37 and is adapted to receive a pressurized gas and to direct the flow of this gas towards the ring of turbine blades 34 from the outside of the ring. The nozzle 40 is directed such that the gas flow will bring the blades 34 and, thereby, the whole of the rotor 19 into rotation about the rotational axis R, counter clockwise with respect to FIG. 2.

The blades 34 are somewhat curved, as can be seen, although this is not necessary, and they conduct the gas stream supplied between the adjacent blades to the inside of the ring of blades, where the gas stream enters a small return chamber 41. This return chamber 41 is delimited between, on the one side, a returning member 42 constituting part of the stationary end wall 10 and a plate 42a fixed to the underside of the end wall 10 and, on the other side, the ring of turbine blades 34. The return chamber is formed in a way such that the gas entering into it from the interspaces between the turbine blades is conducted without substantial pressure loss in a curved bath a distance forwards in the rotational direction of the turbine blades to a certain position and, then, again in between the turbine blades 34 present at this position. In this way the pressurized gas is used once more for driving of the ring of turbine blades 34.

When the pressurized gas has again passed through the ring of turbine blades 34, it flows radially outwardly through the interruption or gap 38 in the flange 35 to an annular space 43 in the intermediate part 3 of the stationary housing (see FIG. 1). This space 43 communicates directly with a receiving chamber 44 surrounding the rotor 19 in the stationary housing 1.

As can be seen from the drawings, the part of the housing 1 surrounding the rotor 19 is substantially rotationally symmetrical and it has a shape substantially adapted to the outer shape of the rotor. The outlet 8 for cleaned gas is situated in a conical portion of the housing part 4 at the same axial level as the lower rotor end wall 21. The outlet 9 for material separated from supplied uncleaned gas is situated centrally below the rotor 19 aligned with the rotational axis R of the rotor.

As can also be seen from the drawings (see particularly FIG. 2) the returning member 42 is formed in one piece with and substantially at the same axial level as the sleeve 14 which on its inside supports the bearings 16, 17 for the rotor shaft 18. The returning member 42 thereby is situated radially between the bearing 16, 17 and the turbine blades 34. This gives the centrifugal separator a very compact construction with respect to the arrangement for the driving and journalling of the rotor.

The above described centrifugal separator operates in the following manner.

For rotation of the rotor 19 the nozzle 40 is charged from a source, not shown, with pressurized gas, e.g. compressed air. A gas stream is directed by the nozzle 40 from a gas supply area, formed by the gap 37 in the flange 35 radially outside the ring of turbine blades 34, towards the outside of this ring, so that the gas flows between the blades and brings them, and thereby the rotor 19, into rotation counter clockwise with respect to FIG. 2.

Driving gas coming out from the blade interspaces on the inside of the blade ring enters the return chamber 41, in which it is deflected forwardly in the rotational direction of the blade ring and then is again directed towards the blades 34 for renewed driving thereof. After having been used twice for driving of the turbine blades the gas comes out through the gap 38 in the flange 35 into the space 43 (see FIG. 1), from where it flows further on out into the receiving chamber 44 surrounding the rotor 19.

A contaminated gas to be cleaned from solid and/or liquid particles suspended therein is supplied through the gas inlet 7 in the stationary upper housing part 2. The gas flows further on through the passages 15 and the rotor inlet 31*a* into the central space 28*a* in the rotor 19. From the central space 28*a* the contaminated gas flows further through the flow passages 23 between the conical portions 26 of the separation discs 22.

Between the separation discs 22 the contaminated gas is brought into rotation by the rotor, particles present in the gas and having a density larger than that of the gas being separated as a consequence of the centrifugal force and being brought into contact with the upper sides of the conical portions 26 of the separation discs. In contact with these portions of the separation discs the particles move as a consequence of the centrifugal force radially along generatrices of the portions 26, the particles, or coalesced liquid particles, being collected by the inclined ribs 30. The separated particles are moved by the centrifugal force further on along the ribs 30 to the circumferential edges of the separation discs, from where they are thrown away from the discs and hit the surrounding wall 3 of the housing.

The gas successively freed from particles flows between the adjacent separation disc 22, guided by the ribs 30, towards the surrounding edges of the discs and leaves the rotor at these edges. Through the receiving chamber 44 the cleaned gas flows out of the housing 1 through the outlet 8. This outlet 8, as can be seen, is placed below the level at which particles separated from the gas are thrown away from the rotor 19 towards the surrounding wall 3. Also the gas having been used for driving of the rotor leaves the stationary housing through the outlet 8.

Due to the fact that the contaminated gas enters the central space 28*a* in the rotor 19 substantially without rotational movement, whereas the cleaned gas leaves the rotor under rotation at a radius larger than the radius of the central space 28*a*, an underpressure will arise in the central space 28*a*. Hereby, the contaminating gas need not be supplied to the rotor at an over pressure. Instead, it may be sucked into the rotor from the gas inlet 7 of the stationary housing 1.

The particles separated from the gas, solid and/or liquid, move downwardly along the inside of the surrounding wall 3 and further along the conical lower part of the housing 1 and out through the outlet 9. By the shape as shown in FIG. 1 of the outlet pipe forming the outlet 8, i.e. by the fact that this outlet pipe extends a short distance into the interior of the housing 1 and is provided with a flange, it is avoided that separated particles are entrained with cleaned gas out through the outlet 8.

What is claimed is:

1. A centrifugal separator for freeing a gaseous fluid from particles suspended therein, solid and/or liquid, having a density larger than that of the gaseous fluid, the centrifugal separator comprising:
   a rotor, that is rotatable about a rotational axis and has at one axial end a central inlet for said gaseous fluid, the rotor further delimiting a central space communicating with said central inlet,
   driving means for rotating the rotor about said rotational axis, a stationary housing which with a surrounding wall surrounds the rotor and said rotational axis and which between the rotor and the surrounding wall delimits a receiving chamber for cleaned gaseous fluid as well as separated particles,
   separation members which are supported by the rotor around said central space and which form several separation passages having inlet ends communicating with the central space in the rotor and outlet ends opening directly in a part of said receiving chamber between the rotor and said surrounding wall, and wherein
   said driving means includes several turbine members, which are supported by the rotor and arranged in a ring around the central inlet of the rotor, and at least one supply member that is adapted to receive a gaseous driving fluid and direct this towards the turbine members for rotation of the rotor about said rotational axis.

2. A centrifugal separator according to claim 1, wherein the centrifugal separator includes a stationary first outlet member, which forms a gas outlet from the receiving member for gaseous fluid having been freed from particles, and a stationary second outlet member forming a particle outlet from the receiving chamber, separated from the gas inlet, for particles having been separated from the gaseous fluid.

3. A centrifugal separator according to claim 2, wherein the rotor is oriented such that said rotational axis extends substantially vertically.

4. A centrifugal separator according to claim 3, wherein the central inlet of the rotor is situated at the upper axial end of the rotor.

5. A centrifugal separator according to claim 3, wherein said gas outlet is situated below said part of the receiving chamber wherein the separation passages open with their outlet ends.

6. A centrifugal separator according to claim 4, wherein said particle outlet is situated centrally below the rotor substantially aligned with said rotational axis.

7. A centrifugal separator according to claim 6, wherein the stationary housing is tapering substantially conically towards the particle outlet.

8. A centrifugal separator according to claim 7, wherein the gas outlet is situated in the conically tapering part of the stationary housing.

9. A centrifugal separator according to claim 1, wherein said separations members includes stack of conical separation discs arranged coaxially with said rotational axis and forming said separation passages between themselves.

10. A centrifugal separator according to claim 9, wherein the conical separation discs have apex ends and base ends, said base ends of the discs facing axially towards said central inlet.

11. A centrifugal separator according to claim 9, wherein each conical separations disc has several central through openings forming together with interspaces between the separation discs said central space in the rotor.

12. A centrifugal separator according to claim 1, wherein the stationary housing is formed such that driving fluid, that leaves the ring of turbine blades, is conducted into said receiving chamber.

13. A centrifugal separator according to claim 12, wherein a space surrounding the ring of turbine members and adapted to receive driving fluid having been used for driving of the rotor communicates with said receiving chamber.

14. A centrifugal separator according to claim 1, wherein the rotor at its axial end having said central inlet has a bowl-formed end wall having a concave outside, the ring of turbine members being supported at a radially outer edge portion of said bowl-formed end wall.

15. A centrifugal separator according to claim 14, wherein separation members supported by the rotor include a stack of conical separation discs having apex ends and base ends, the base ends facing axially towards said bowl-formed end wall.

16. A centrifugal separator according to claim 1, wherein the rotor is connected with a shaft that through a bearing is supported by a stationary supporting member, said gas inlet extending through an annular area around the rotational axis, situated between the stationary supporting member and the ring of turbine members.

* * * * *